(12) United States Patent
Lee

(10) Patent No.: US 9,658,384 B2
(45) Date of Patent: May 23, 2017

(54) LIGHTING DEVICE FOR BUTTON OF AUDIO-VISUAL SYSTEM

(71) Applicant: HYUNDAI MOBIS CO., LTD., Seoul (KR)

(72) Inventor: Joung Hoon Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 83 days.

(21) Appl. No.: 14/688,282

(22) Filed: Apr. 16, 2015

(65) Prior Publication Data
US 2015/0362658 A1 Dec. 17, 2015

(30) Foreign Application Priority Data
Jun. 17, 2014 (KR) .................. 10-2014-0073624

(51) Int. Cl.
| G02B 6/00 | (2006.01) |
| F21V 8/00 | (2006.01) |
| B60K 37/06 | (2006.01) |
| H01H 13/83 | (2006.01) |

(52) U.S. Cl.
CPC ............ *G02B 6/0045* (2013.01); *B60K 37/06* (2013.01); *G02B 6/0031* (2013.01); *G02B 6/0073* (2013.01); *G02B 6/0095* (2013.01); *H01H 13/83* (2013.01); *B60K 2350/2039* (2013.01); *H01H 2209/0021* (2013.01); *H01H 2219/016* (2013.01); *H01H 2219/056* (2013.01); *H01H 2219/062* (2013.01)

(58) Field of Classification Search
CPC ............ H01H 13/83; H01H 2219/062; H01H 2219/0621; H01H 2219/0622; G02B 6/0045; G02B 6/0031; G02B 6/0073; G02B 6/0095
USPC .................................. 200/310–317
See application file for complete search history.

(56) References Cited

U.S. PATENT DOCUMENTS

| 2006/0193147 A1* | 8/2006 | Inoue | G02B 6/0018 362/602 |
| 2012/0120681 A1* | 5/2012 | Yamasaki | G03B 15/04 362/611 |
| 2014/0334125 A1* | 11/2014 | Yao | G02B 6/0055 362/23.03 |
| 2015/0213976 A1* | 7/2015 | Okazaki | H01H 13/86 463/31 |

* cited by examiner

*Primary Examiner* — Sean Gramling
*Assistant Examiner* — Gerald J Sufleta, II
(74) *Attorney, Agent, or Firm* — NSIP Law

(57) ABSTRACT

The present invention relates to a lighting device for a button, in which light incident into a light guide is prevented from leaking to a spacing clearance between a button unit and a light guide by a reflection layer, thereby enabling a lighting through the light guide to shine cleanly and uniformly to the outside.

9 Claims, 7 Drawing Sheets

A-A'

B-B'

LIGHTING DEVICE FOR BUTTON OF AUDIO-VISUAL SYSTEM

CROSS-REFERENCE TO RELATED APPLICATIONS

This application claims priority under 35 U.S.C. §119 to Korean Patent Application No. 10-2014-0073624, filed on Jun. 17, 2014, in the Korean Intellectual Property Office, the disclosure of which is incorporated herein by reference in its entirety.

TECHNICAL FIELD

The present invention relates to a lighting device for a button, and particularly, to a lighting device for a button, which is mounted on an AVN, and the like of a vehicle to show a metal plating effect in the daytime and show a lighting effect at night.

BACKGROUND

In general, an audio-visual (AV) system is mounted on a crash pad installed throughout an interior of a vehicle in order to secure a driver's convenience.

A monitor, which can display AV system related information or display map information with introduction of a navigation system so as for the driver to easily recognize required information visually, is mounted integrally with an AV system.

Meanwhile, in recent years, an AV system, which enables the driver to watch broadcasting through a public TV network or a satellite or view DVD movies even in motion, has been mounted.

Therefore, a function of an AV apparatus installed on the crash pad of the vehicle, such as watching TV or a movie as well as listening to music, has been more diversified and complicated.

As a result, multiple operating buttons to drive the aforementioned various functions are provided on a front panel of the AV apparatus, and a lighting button, which can be lit by an LED installed on a printed circuit board (PCB), is provided so as for the driver to easily recognize the buttons even at night.

The lighting button is generally configured to include a button unit and a light guide (reflector) that is placed on the circumference of the button unit and radiate light generated from a light source unit to the outside.

When the button unit is a push type, the button unit and the light guide are spaced apart from each other in order to prevent interference caused by a contact between the light guide placed on the circumference of the button unit and the button unit when the button unit is pressed.

Accordingly, the light radiated from the light source unit leaks to the outside through a spaced clearance between the light guide and the button unit, and as a result, an effect of a lighting cannot be clearly expressed and the lighting becomes nonuniform.

SUMMARY

The present invention has been made in an effort to provide a lighting device for a button, which can prevent light from leaking through a clearance between a push-type button unit and a light guide, and enables a lighting of the button to be uniformly radiated.

An exemplary embodiment of the present invention provides a lighting device for a button including: a front panel; a push type button unit mounted on the front panel; a light guide placed on the circumference of the button unit and configured to radiate light incident through the rear to the front; and a light source unit placed at the rear of the light guide and configured to make light be incident into the rear of the light guide, in which the button unit and the light guide are spaced apart from each other, the light guide includes: an incident unit formed at the rear of the light guide and configured to receive light incident through the light source unit; a radiation unit formed at the front of the light guide and configured to radiate the light incident through the incident unit to the outside; and a reflection layer plated onto the surface of a remaining lateral portion other than the incident unit and the radiation unit to reflect the light, and the light incident into the light guide is prevented from leaking to a spaced space between the button unit and the light guide by the reflection layer.

The reflection layer may be formed by a white spray layer.

The light guide may further include a metal plated layer plating the reflection layer and the radiation unit.

The light guide may be formed in a hollow shape to cover the button unit.

The light guide may further include a reflection unit configured to reflect the light incident through the incident unit to the radiation unit, and the reflection layer may be plated on the surface of the reflection unit.

A refraction surface, which inclines to a path of the light radiated to the front from the light source unit, may be formed in the incident unit, and light incident with being refracted into the light guide through the refraction surface may be reflected by the reflection unit and move the radiation unit.

The reflection unit may be formed to incline along the circumference of the light guide.

The incident unit may be formed to dent to the front from the rear of the light guide.

The light source unit may include: a substrate placed at the rear of the button unit and the light guide; an LED mounted on the substrate and facing the incident unit; and a blocking unit configured to cover the circumference of the LED, and light generated by the LED may be blocked from being radiated in a lateral direction by the blocking unit, and radiated to the incident unit.

The lighting device for the button of the present invention described above provides the following effect.

Light does not leak to a spacing space between the button unit and the light guide by the reflection layer, and leaks to the outside through only the radiation unit, and as a result, a lighting through the light guide can shine cleanly and uniformly to the outside.

Other features and aspects will be apparent from the following detailed description, the drawings, and the claims.

DETAILED DESCRIPTION OF EMBODIMENTS

Figure 1:
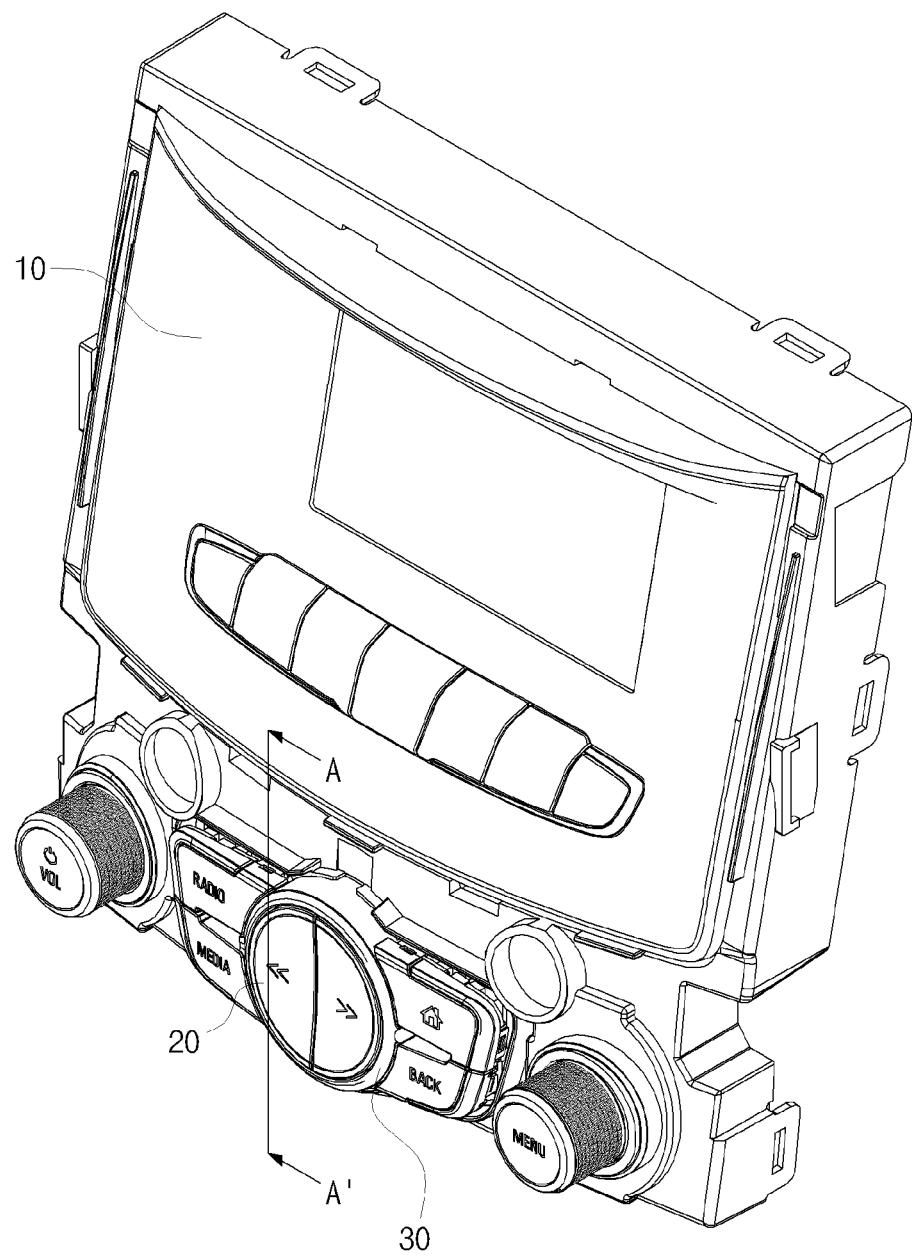
FIG. 1 is a perspective view of a lighting device for a button according to an exemplary embodiment of the present invention.
Figure 2:
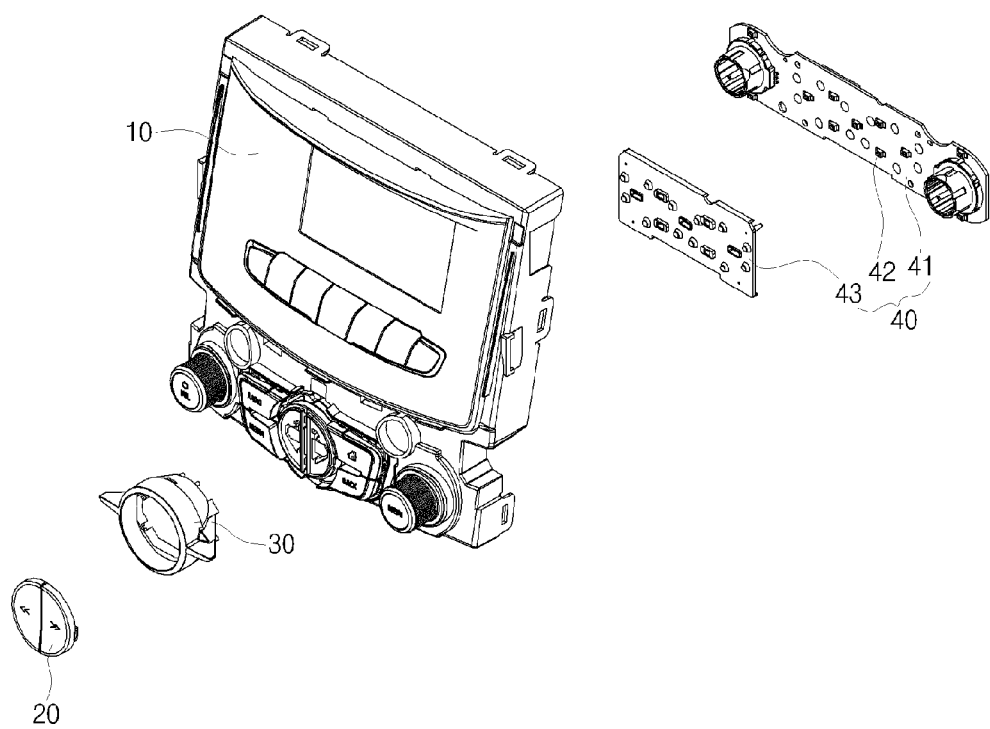
FIG. 2 is an exploded perspective view of the lighting device for the button according to the exemplary embodiment of the present invention.
Figure 3:
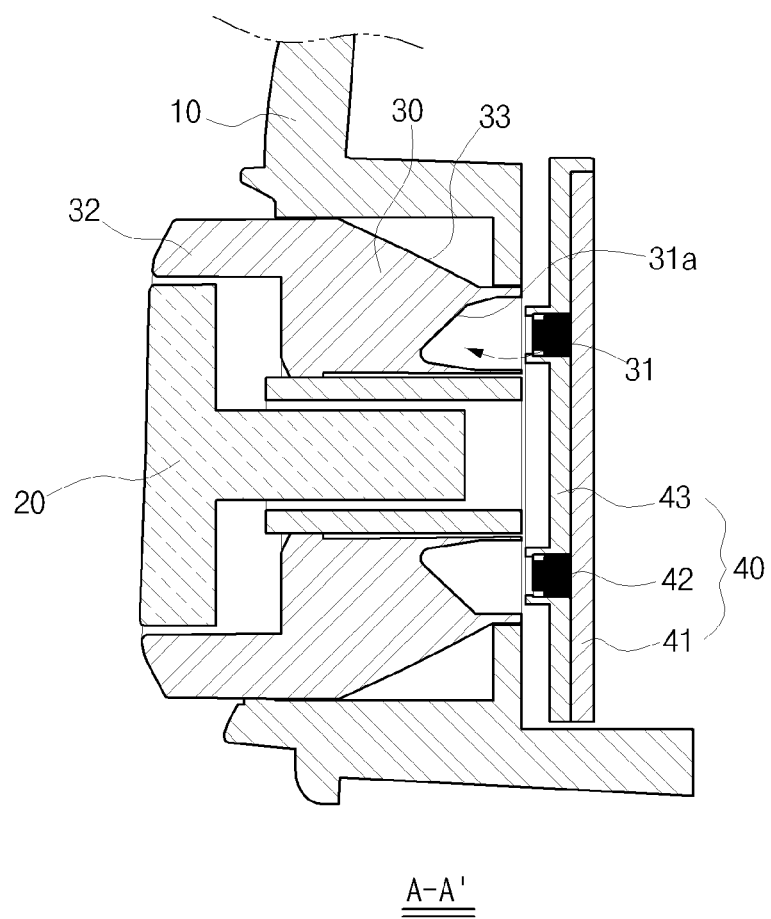
FIG. 3 is a cross-sectional view taken along line A-A' of FIG. 1.
Figure 4:
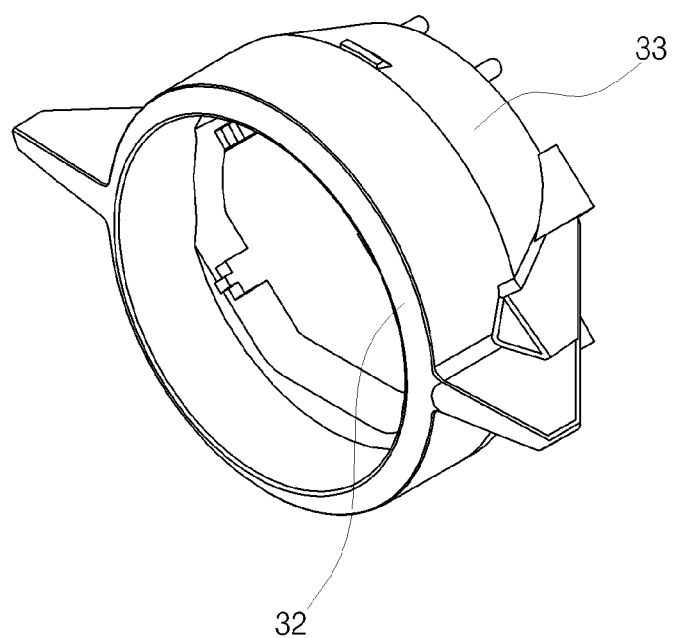
FIG. 4 is a perspective view of a light guide in one direction according to the exemplary embodiment of the present invention.
Figure 5:
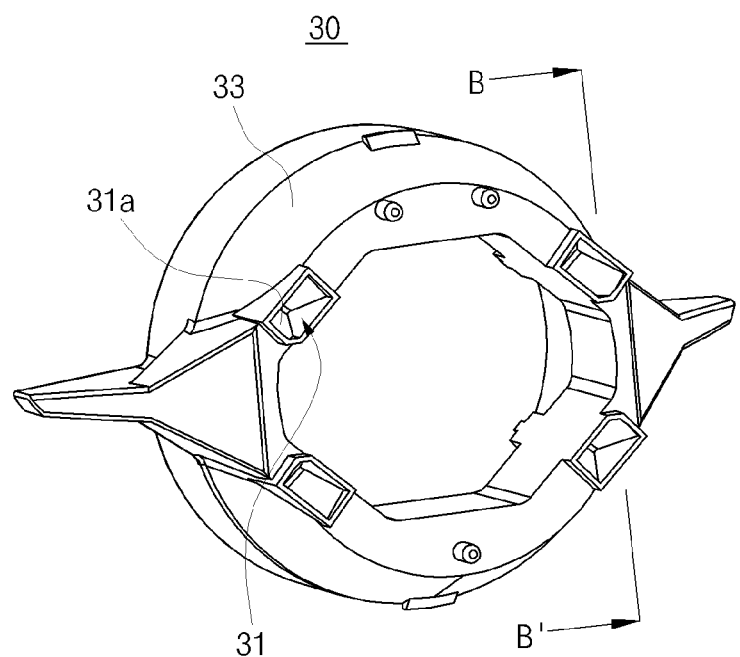
FIG. 5 is a perspective view of the light guide in the other direction according to the exemplary embodiment of the present invention.
Figure 6:
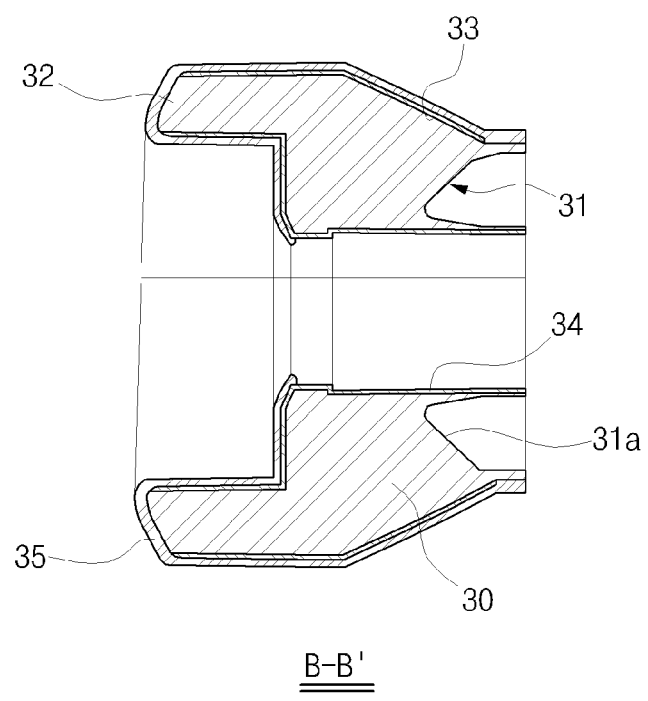
FIG. 6 is a cross-sectional view of the light guide taken along line B-B' of FIG. 5.

FIG. 1 is a perspective view of a lighting device for a button according to an exemplary embodiment of the present invention. FIG. 2 is an exploded perspective view of the lighting device for the button according to the exemplary embodiment of the present invention. FIG. 3 is a cross-sectional view taken along line A-A' of FIG. 1. FIG. 4 is a perspective view of a light guide in one direction according to the exemplary embodiment of the present invention. FIG. 5 is a perspective view of the light guide in the other direction according to the exemplary embodiment of the present invention. FIG. 6 is a cross-sectional view of the light guide taken along line B-B' of FIG. 5.

As illustrated in FIGS. 1 to 6, the lighting device for a button according to the present invention includes a front panel 10, a button unit 20, a light guide 30, and a light source unit 40.

The front panel 10 means an AVN for a vehicle, and the like and forms an overall outer shape of the present invention.

The button unit 20 is configured as a push type and mounted on the front panel 10.

The light guide 30 is placed on the circumference of the button unit 20 and serves to radiate light incident through the rear to the front side.

The light guide 30 may be formed by an injection material such as PC, or the like and in various shapes.

In the exemplary embodiment, the light guide 30 is formed in a hollow shape like a pipe, and the like.

The button unit 20 is placed inside the light guide 30 formed in the hollow shape.

In this case, the button unit 20 and the light guide 30 are spaced apart from each other, and as a result, the button unit 20 may be easily pressed inside the light guide 30 by external force.

In the exemplary embodiment, the light guide 30 includes an incident unit 31, a radiation unit 32, a reflection unit 33, a reflection layer 34, and the like.

The incident unit 31 is a portion in which light is incident, which is radiated through the light source unit 40 that is formed at the rear of the light guide 30 and generates light.

The incident unit 31 is formed to dent from the rear to the front of the light guide 30.

In the exemplary embodiment, the light source unit 40 is constituted by four LEDs 42, and four incident units 31 are also provided, and the LEDs 42 are placed at the incident units 31, respectively.

A refraction surface 31a, which inclines to a path of the light radiated to the front from the light source unit 40, is formed in the incident unit 31.

That is, the light radiated by the light source unit 40 is incident into the light guide 30 with being refracted at a predetermined angle by the refraction surface 31a.

The radiation unit 32 is formed at the front of the light guide 30 and serves to radiate the light incident through the incident unit 31 to the outside.

The radiation unit 32 is placed between the front panel 10 and the button unit 20 to be exposed to the outside.

The reflection unit 33 serves to reflect the light incident through the incident unit 31 to the radiation unit 32.

In the exemplary embodiment, the reflection unit 33 is formed to incline along the circumference of the outer peripheral surface of the light guide 30.

The reflection layer 34 is plated on the surface of a remaining lateral portion of the light guide 30 other than the incident unit 31 and the radiation unit 32 and serves to reflect the light incident into the light guide 30 through the incident unit 31 so as not to leak to a separation space between the button unit 20 and the light guide 30.

Accordingly, the light incident into the light guide 30 from the light source unit 40 is prevented from leaking to the separation space between the button unit 20 and the light guide 30 by the reflection layer 34, and radiated to the outside through only the radiation unit 32.

The reflection layer 34 is illustrated in detail in FIG. 6.

The reflection layer 34 needs to be displayed with being plated even on the light guide 30 on the drawings other than FIG. 6, but the reflection layer 34 is not illustrated in the drawings other than FIG. 6 in order to simply illustrate the drawings.

In the exemplary embodiment, the reflection layer 34 is plated on the lateral portion of the light guide 30 including the surface of the reflection unit 33.

As a result, the light incident with being refracted through the refraction surface 31a of the incident unit 31 does not leak to the outside by the reflection layer 34, and reflected at a predetermined angle by the reflection unit 33 and radiated to the outside through the radiation unit 32.

The reflection layer 34 is formed by a white spray layer, and as a result, the light incident into the light guide 30 through the incident unit 31 is not absorbed and does not leak to the outside but is reflected.

When the reflection layer 34 is formed by a black spray layer, the reflection layer 34 absorbs the light, and as a result, the reflection layer 34 does not serve as a reflection plate, thereby generating a shadow on an exterior surface.

The light guide 30 further includes a metal plated layer 35 that plates the reflection layer 34 and the radiation unit 32 as illustrated in FIG. 6.

The metal plated layer 35 needs to be displayed even in the light guide 30 of the drawings other than FIG. 6 together with the reflection layer 34, but is not illustrated in the drawings other than FIG. 6 in order to simply illustrate the drawings.

In the daytime when the light is not radiated by the light source unit 40, the radiation unit 32 of the light guide 30 looks like metal from the outside by the metal plated layer 35, thereby achieving a metal plating effect.

In addition, at night when the light is radiated by the light source unit 40, the light incident into the light guide 30 is radiated to the outside while penetrating the metal plated layer 35 plated on the radiation unit 32, thereby achieving the lighting effect.

The metal plated layer 35 is formed by depositing aluminum, and the like.

The light source unit 40 is placed at the rear of the light guide 30 and irradiates light to be incident into the rear of the light guide 30.

In more detail, the light source unit 40 irradiates light to the incident unit 31 of the light guide 30.

The light source unit 40 includes a substrate 41, an LED 42, and a blocking unit 43.

The substrate 41 is placed at the rear of the button unit 20 and the light guide 30.

The LED 42 is mounted on the substrate 41 and faces the incident unit 31.

In the exemplary embodiment, four LEDs 42 are provided as many as the incident units 31.

The blocking unit 43 is formed by a rubber pad and mounted on the substrate 41, and covers the circumference of the LED 42.

Light generated by the LED 42 is blocked from being radiated in a lateral direction by the blocking unit 43, and radiated to the incident unit 31.

The light radiated by the LED 42 does not leak in the lateral direction but is collected by the blocking unit 43, and as a result, more light may be incident into the incident unit 31.

Hereinafter, an operating process of the present invention configured as above will be described.

Figure 7:
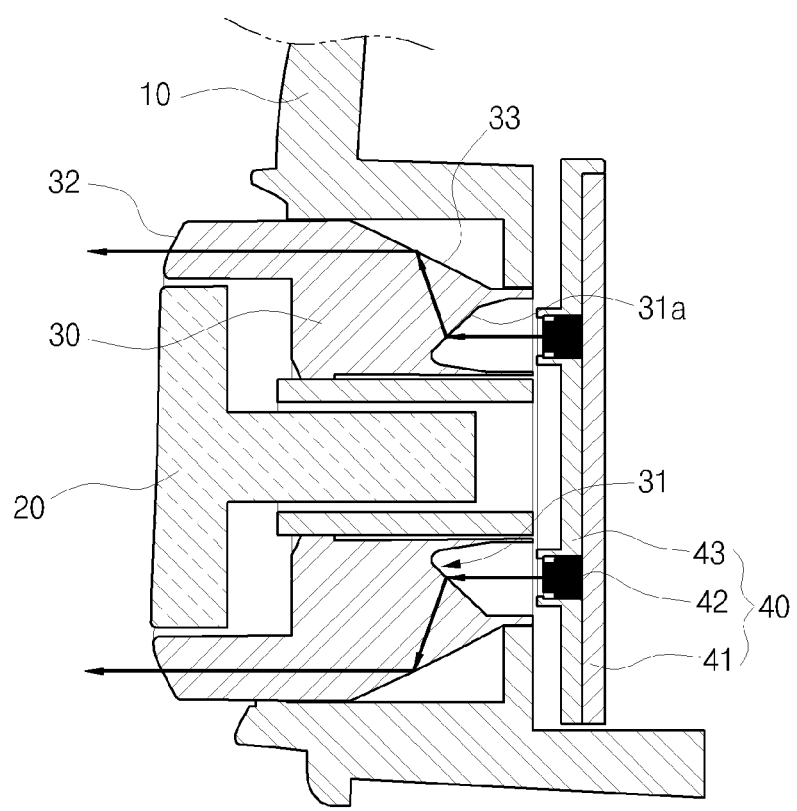
FIG. 7 is a cross-sectional view illustrating a light radiation process of the lighting device for the button according to the exemplary embodiment of the present invention.

FIG. 7 is a cross-sectional view illustrating a light radiation process of the lighting device for the button according to the exemplary embodiment of the present invention.

When light is radiated from the LED 42, the light is blocked from being radiated in the lateral direction by the blocking unit 43.

Therefore, the light generated by the LED 42 moves to the incident unit 31 that is placed at the front.

The light, which moves to the incident unit 31, is refracted at a predetermined angle while penetrating the refraction surface 31a that is formed to incline, and is incident into the light guide 30.

The light incident into the light guide 30 moves at the angle refracted by the refraction surface 31a, and thereafter, reflected by the reflection unit 33 and the reflection layer 34 to move to the radiation unit 32.

In this case, the light incident into the light guide 30 by the reflection layer 34 does not leak to the outside through a lateral surface of the light guide 30 but is present only inside the light guide 30.

The light moves to the radiation unit 32 while being reflected by the reflection unit 33.

The light, which moves to the radiation unit 32, is discharged to the outside by penetrating the metal plated layer 35, thereby achieving the lighting effect.

In particular, the light does not leak to the spacing space between the button unit 20 and the light guide 30 by the reflection layer 34, and leaks to the outside through only the radiation unit 32, and as a result, the lighting through the light guide 30 can shine cleanly and uniformly to the outside.

The lighting device for a button according to the present invention is not limited to the aforementioned exemplary embodiment, and may be variously modified and carried out within the scope permitted by the technical spirit of the present invention.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A lighting device for a button, the lighting device comprising:
    a front panel;
    a push-type button mounted on the front panel;
    a light guide placed on a circumference of the button and configured to radiate light incident through a rear of the light guide to a front of the light guide, the light guide comprising:
        an incident surface formed at the rear of the light guide,
        a radiation surface formed at the front of the light guide and configured to radiate the light through the incident surface,
        a first central through hole,
        a reflection layer disposed along a surface of the first central through hole and configured to prevent light incident to the light guide from leaking into a space between the button and the light guide, and
        a second central through hole steppedly extending from the first central through hole; and
    a light source placed at the rear of the light guide and configured to project light incident to the rear of the light guide, the light source comprising:
        a substrate placed at a rear of the button,
        a blocking plate comprising a third hole, and
        an LED mounted on the substrate, facing the incident surface, and inserted into the third hole,
    wherein the incident surface is configured to receive light through the light source,
    wherein the blocking plate is configured to prevent light generated by the LED from being radiated in a lateral direction,
    wherein the button and the light guide are spaced apart from each other, and
    wherein a cross sectional area of the second central through hole is larger than a cross sectional area of the first central through hole.

2. The lighting device of claim 1, wherein the reflection layer is a white layer formed by applying a spray.

3. The lighting device of claim 1, wherein the light guide further comprises a metal plated layer covering the reflection layer and the radiation surface.

4. The lighting device of claim 1, wherein the light guide further comprises a reflection surface configured to reflect the light incident through the incident surface to the radiation surface, and
    wherein the reflection layer is plated on the reflection surface.

5. The lighting device of claim 4, wherein a refraction surface inclines to a path of the light radiated to the front from the light source and is formed in the incident surface, and
    wherein light refracted into the light guide through the refraction surface is reflected by the reflection surface and passes through the radiation surface.

6. The lighting device of claim 5, wherein the reflection surface comprises an incline along the circumference of the light guide.

7. The lighting device of claim 5, wherein the incident surface comprises a dent formed in the rear of the light guide.

8. The device of claim 1, and the button is disposed inside the first central through hole and the second central through hole.

9. The device of claim 1, further comprising a metal layer covering an exterior surface of the light guide, the radiation surface, and a surface of the second central through hole.

* * * * *